(12) United States Patent
Chao et al.

(10) Patent No.: US 12,524,237 B2
(45) Date of Patent: Jan. 13, 2026

(54) DATA PADDING METHOD AND APPARATUS

(71) Applicant: Montage Electronics (Shanghai) Co., Ltd., Shanghai (CN)

(72) Inventors: Yang Chao, Shanghai (CN); Men Long, Shanghai (CN); Xudong Xu, Shanghai (CN); Jun Yang, Shanghai (CN)

(73) Assignee: MONTAGE ELECTRONICS (SHANGHAI) CO., LTD., Shanghai (CN)

( * ) Notice: Subject to any disclaimer, the term of this patent is extended or adjusted under 35 U.S.C. 154(b) by 113 days.

(21) Appl. No.: 18/633,517

(22) Filed: Apr. 12, 2024

(65) Prior Publication Data

US 2024/0378057 A1 Nov. 14, 2024

(51) Int. Cl.
*G06F 9/30* (2018.01)
*G06F 21/60* (2013.01)

(52) U.S. Cl.
CPC ........ *G06F 9/30134* (2013.01); *G06F 21/608* (2013.01)

(58) Field of Classification Search
CPC ..... G06F 9/30134; G06F 21/068; G06K 9/36; G06K 9/46
See application file for complete search history.

(56) References Cited

U.S. PATENT DOCUMENTS

2001/0005432 A1* 6/2001 Takahashi ............ H04N 19/436
375/E7.076

* cited by examiner

*Primary Examiner* — Joseph J Lauture
(74) *Attorney, Agent, or Firm* — Junhe Law Office P.C.; James J. Zhu

(57) ABSTRACT

A data padding method comprises: determining a length of a space occupied by remaining data in the register; comparing the length of the space occupied; performing, when the length of the space occupied by the remaining data is less than the length of the unit input data, following operations: receiving a unit input data and storing it continuously with the remaining data in the register; determining a length of a unit output data to be output; intercepting a portion of data with a length of N words from data formed by padding the remaining data buffered in the register and the unit input data and starting from an address space of a lowest bit of the register, as the unit output data and outputting it; and shifting the data remaining in the register as a whole to an address space in the register starting from the lowest bit.

11 Claims, 4 Drawing Sheets

FIG. 4

DATA PADDING METHOD AND APPARATUS

TECHNICAL FIELD

This application relates to computer technology field, and more specifically, to a data padding method and a data padding apparatus.

BACKGROUND OF THE INVENTION

With development of computer systems, components of computer systems have become increasingly complex. Therefore, the complexity of the interconnection architectures used for coupling and communication between components also increases to ensure requirements of high bandwidth and low latency. In order to effectively enhance and improve high-speed interconnection of CPU to devices and CPU to memory, Compute Express Link (CXL) emerges. CXL can ensure memory coherency between a memory of CPU and a memory on an attached device, allowing for faster and more efficient data transmission and resource sharing between the device and the processor.

However, during the high-speed data transmission, for example, in the conversion process of microchip (FLIT, also known as Flow Control Unit) data in the CXL Integrity and Data Encryption (IDE) module to Advanced Encryption Standard Galois/Counter Mode (AES_GCM) encryption and decryption data format, a problem of inconsistent transmission data lengths is often encountered. An existing solution is to use a large number of storage addresses for performing data padding on the data. However, this approach not only wastes a large amount of storage addresses for data alignment and padding processing, but also in the face of complex and high-speed data processing scenarios, the difference between the input bit width and the output bit width may have a serious impact on the efficiency of data processing (such as data reading and writing).

Therefore, there is a need for an improved method for data length conversion processing based on compute express link transmission.

SUMMARY OF THE INVENTION

One objective of the present application is to provide a data padding method and a data padding apparatus.

According to one aspect of the present application, a data padding method is provided. The data padding method comprises: determining, after at least part of data in a shift register is output, a length of a space occupied by remaining data in the shift register; comparing the length of the space occupied by the remaining data with a length of a unit input data which is M words; performing, in the case where a comparing result indicates that the length of the space occupied by the remaining data is less than the length of the unit input data, following operations: receiving a unit input data and storing the unit input data in the shift register, wherein the unit input data is stored continuously with the remaining data; determining a length of a unit output data to be output which is N words, wherein N is smaller than or equal to M; intercepting a portion of data with a length of N words from data formed by padding the remaining data buffered in the shift register and the unit input data and starting from an address space of a lowest bit of the shift register, as the unit output data and outputting the unit output data; and shifting the data remaining in the shift register as a whole to an address space in the shift register starting from the lowest bit of the shift register.

By adopting the above-mentioned method of data length conversion processing, data contents of different lengths can be uniformly processed, which effectively improves the efficiency of data processing.

According to another aspect of the present application, a data padding apparatus is provided. The data padding apparatus comprises: a shift register configured to receive and store, under a control of a controller, a unit input data and a unit output data, wherein a length of the unit output data, which is N words, is less than or equal to a length of the unit input data, which is M words; and a controller configured to determine, after at least part of data in a shift register is output, a length of a space occupied by remaining data in the shift register, and perform, in the case where the length of the space occupied by the remaining data is less than the length of the unit input data, following operations: receiving a unit input data and storing the unit input data in the shift register, wherein the unit input data is stored continuously with the remaining data; determining a length of a unit output data to be output; intercepting a portion of data with a length of N words from data formed by padding the remaining data buffered in the shift register and the unit input data and starting from an address space of a lowest bit of the shift register, as the unit output data and outputting the unit output data; and shifting the data remaining in the shift register as a whole to an address space in the shift register starting from the lowest bit of the shift register.

The above is an overview of the application, and may be simplified, summarized and omitted in detail. Therefore, those skilled in the art should realize that this part is only illustrative, and is not intended to limit the scope of the application in any way. This summary section is neither intended to determine the key features or essential features of the claimed subject matter, nor is it intended to be used as an auxiliary means to determine the scope of the claimed subject matter.

BRIEF DESCRIPTION OF DRAWINGS

Through the following detailed description in conjunction with the accompanying drawings and the appended claims, those skilled in the art will more fully understand the above and other features of the content of this application. It can be understood that these drawings only depict several implementations of the content of the present application, and should not be considered as limiting the scope of the content of the present application. By referring to the drawings, the content of this application will be explained more clearly and in detail.

FIG. 4 illustrates an example of performing data padding according to an embodiment of the present application.

DETAILED DESCRIPTION OF THE INVENTION

Figure 1:
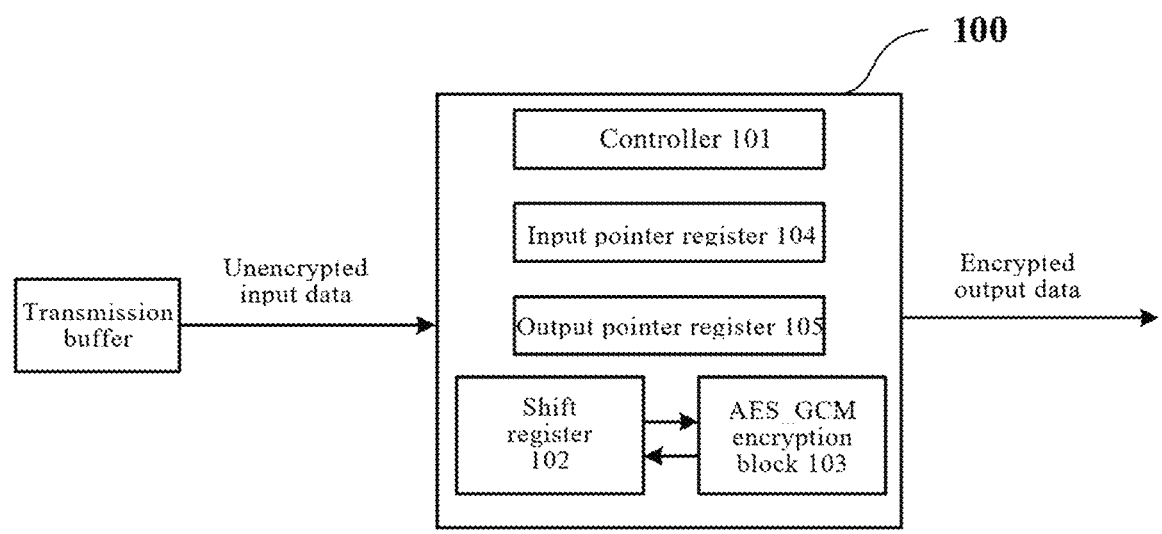
FIG. 1 illustrates a data padding apparatus according to an embodiment of the present application.

In the following detailed description, reference is made to the drawings constituting a part of the specification. In the drawings, unless the context dictates otherwise, similar symbols usually indicate similar components. The illustrative embodiments described in the detailed description, drawings, and claims are not meant to be limiting. Without departing from the spirit or scope of the subject matter of the present application, other implementation modes can be adopted and other changes can be made. It can be understood that various aspects of the content of the application generally described in the application and illustrated in the drawings can be configured, replaced, combined, and designed with various different configurations, and all of these clearly constitute part of the content of the application.

The Compute Express Link (CXL) interconnects a host processor with a workload accelerator to enable communication between the host processor and the workload accelerator. In some embodiments, the host processor may be a CPU, and the workload accelerator may be a graphics processing unit (GPU), a field programmable gate array (FPGA) device, a tensor and vector processor unit, a machine learning accelerator, a dedicated accelerator, etc. In fact, as accelerators are increasingly used to complement CPUs to support emerging computing applications (e.g., Artificial Intelligence, machine learning, and other applications), CXL is designed as a standard interface that supports high-speed communication.

The CXL is a dynamic multi-protocol technology and is designed to support various accelerators. The CXL provides a rich set of protocols through discrete links or on-package links, including an input/output protocol (CXL.io), a cache protocol (CXL.cache), and a memory protocol (CXL.mem). Among them, the CXL I/O protocol (CXL.io) provides a non-coherent load/store interface for I/O devices. Transaction types, transaction grouping formatting, credit-based flow control, virtual channel management, and transaction ordering rules in CXL.io may follow all or a part of PCIe definitions. The CXL cache coherence protocol (CXL.cache) allows devices to consistently access and cache a memory of the host processor through a low-latency request/response interface, it defines interactions between a device and a host as multiple requests, each with at least one associated response message, and sometimes being data transfer. The CXL memory protocol (CXL.mem) allows the host processor to consistently access a memory on an attached device using load/store instructions, and it is a transaction interface between a processor and a memory and uses physical and link layers of CXL when communication across dies is performed.

In a CXL link, information or data is transmitted in the form of packets. The link layer of the CXL receives data from the transaction layer, processes the data to be a FLIT data type, and then sends the same to the physical layer. Herein, the FLIT is the minimum transmission unit of the link layer. FLIT may include multiple pieces of information. For example, the request information and the response information may be simultaneously included in one packet to increase communication speed. In some embodiments, a length of the FLIT is fixed. In some embodiments, the length of the FLIT is 512 bits (excluding CRC check code).

In order to ensure data security, Integrity and Data Encryption (IDE) mechanism needs to be provided for the data transmitted via the CXL link, and it may provide confidentiality, integrity and replay protection for FLIT, ensuring that the data transmitted on the link will not be observed, tampered with, deleted, inserted and replayed, etc. In general, protocols based on the Advanced Encryption Standard (AES) may be used to encrypt data and/or provide data integrity. For example, IDE is based on the AES_GCM encryption algorithm and receives a key from an authentication and key management security component. In a specification of the AES standard, a length of a packet may only be 128 bits or an integer multiple of it. The process of encryption using the AES_GCM encryption algorithm includes splitting the FLIT data into multiple packets, encrypting one packet of data at a time until the entire FLIT data is encrypted. In some embodiments, all FLIT data may be encrypted and protected for integrity. In some embodiments, only a part of the FLIT data may be encrypted.

In embodiments of the present application, during a data transmission process via the CXL link, a conversion between lengths of input data and output data is usually needed. For example, the length of the input data FLIT is always 512 bits (also referred to as "unit input data" hereinafter), and depending on different data flows of the actual CXL data link layer, there may be three situations for the length of the output data, which may be 512 bits, 480 bits, and 384 bits respectively. It can be seen that the length of the input data is always greater than or equal to the length of the output data. When the length of the input data is greater than the length of the output data, a portion of data in the input data, the length of which is equal to the length of the output data, needs to be intercepted for output, and a portion of data in the input data which is not intercepted (i.e., the remaining data) will be padded with the subsequently (for example, in the next clock cycle) received input data together as a padded input data. Similarly, when the length of the padded input data is greater than the required length of the output data, a portion of data in the padded input data, the length of which is equal to the length of the output data, needs to be intercepted for output. This application discloses a method for performing data padding on input data transmitted based on CXL link by a shift register.

FIG. 1 illustrates an apparatus 100 for performing data padding on a unit input data transmitted based on CXL. As illustrated in FIG. 1, the data padding apparatus 100 includes a controller 101 and a shift register 102. The controller 101 is configured to control an input sliding window of the shift register 102 to receive and store the unit input data, with the length of the unit input data being M words. For example, if the length of the unit input data is equal to 512 bits, it is denoted as 16 words, and each word with 32 bits. A counting unit of data bit width may be determined based on any rule. For example, the counting unit may be in a unit of bit or byte, or the like, and a person skilled in the art may perform conversion according to actual situations. The controller 101 is further configured to control an output sliding window of the shift register memory 102 to output the unit output data from the shift register, with the length of the unit output data being N words, where N is less than or equal to M. As mentioned above, depending on different data flows of the CXL data link layer, the length of the output data (N words) includes multiple situations, for example, the length may be equal to 512 bits, 480 bits or 384 bits, which are respectively denoted as 16 words, 15 words or 12 words. In practical applications, one of the output data with the forementioned three lengths may need to be output in each clock cycle.

In particular, the shift register 102 may be configured to store a unit input data which is input in the current clock cycle and remaining data from the previous clock cycle and output the required unit output data under the control of the controller 101. In some embodiments, the length of the shift register 102 may be set according to the length of the unit input data (M words). In some embodiments, the length of the shift register is set to be 2M words. When the length of the unit input data is 512 bits, 2M words are equal to 1024 bits, that is, 32 words. In other embodiments, the length of the shift register 102 may be greater than 2M words. In some embodiments, the shift register 102 may also be used for serial-parallel conversion of data, data operation and data processing, etc., and there is no limitation in this application. Regarding operations of the shift register 102, it will be described in detail below.

The data padding apparatus 100 further includes an AES_GCM encryption block 103 (which may include hardware circuits and/or software for implementing the AES_GCM protocol), and the unit output data is input as plaintext into the AES_GCM encryption block 103, and is encrypted by the AES_GCM encryption block 103 to generate an encrypted ciphertext as output.

The process of encrypting the data during transmission by the data padding apparatus 100 illustrated in FIG. 1 is as follows. Taking a transmission process in the data link layer as an example, the transmission buffer receives, from the transaction layer, information or data to be transmitted and sends the information or data to be transmitted to the data padding apparatus 100. In some embodiments, the transmission buffer may be a memory protocol transmission buffer or a cache protocol transmission buffer. In some embodiments, the transmitted information or data includes CXL.cache and CXL.mem protocol information or data for forming an input data flow. During the current clock cycle, the length of the space occupied by the remaining data of the previous clock cycle in the shift register is determined, and the length of the space occupied by the remaining data is compared with the length of the unit input data (M words). In some embodiments, when the length of the space occupied by the remaining data is greater than or equal to the length of the unit input data (M words), it indicates that the current shift register may output a unit output data of any length. Therefore, there is no need to input a unit input data during the current clock cycle. After the length of the unit output data within the current clock cycle (N words) is determined, a portion of data in the remaining data, the length of which is N words, may be intercepted as the unit output data for output. In some embodiments, when the length of the space occupied by the remaining data is less than the length of the unit input data (M words), it indicates that the current shift register is insufficient to output a unit output data of any length. Therefore, during the current clock cycle, a unit input data needs to be input into the shift register. At this time, the length of the data stored in the shift register is equal to a sum of the length of the remaining data in the previous clock cycle and the length of the unit input data. After the length of the unit output data (N words) is determined, a portion of data with a length of N words may be intercepted from the data formed by padding the remaining data and the unit input data, as the unit output data. The specific data padding method will be described in detail below. Subsequently, the unit output data that is output may be provided with padding values by the AES_GCM encryption block to form ciphertext within the AES_GCM encryption block, and the ciphertext will be output after encryption.

Still referring to FIG. 1, the data padding apparatus 100 further includes an input pointer register 104 and an output pointer register 105, among which, the input pointer register 104 is an input pointer for storing the unit input data. Specifically, the input pointer register 104 includes a low-bit input pointer and a high-bit input pointer. Herein, the low-bit input pointer is used to indicate a starting point of the unit input data, and this low-bit input pointer is configured to point to an address space next to the address space where the last data of the remaining data in the shift register within the current clock cycle is positioned, i.e., Remain+1(words), where the Remain represents the length of the remaining data in the current shift register, and is in a unit of word here, however, a person skilled in the art may make a corresponding data unit conversion. The high-bit input pointer is used to indicate an end point of the unit input data, and this high-bit input pointer is configured to point to an address space of the last bit of the unit input data in the register, that is, Remain+M (words), and an interval between the high-bit input pointer and the low-bit input pointer corresponds to an offset of (M−1) words. The output pointer register 105 is an output pointer for storing the unit output data. Similar to the input pointer register 104, the output pointer register 105 includes a low-bit output pointer and a high-bit output pointer. Among them, the low-bit output pointer is used to indicate a starting point of the unit output data, and the low-bit output pointer is configured to point to an address space of the lowest bit in the shift register; the high-bit output pointer is used to indicate an end point of the unit output data, and the high-bit output pointer is configured to point to an address space storing the end point of the unit output data, that is, point to an address space where the $N^{th}$ word of the shift register is positioned. Based on the implementation of the data padding apparatus 100, since the input pointer register 104 and the output pointer register 105 are added, positions of the input data and the output data may be accurately determined, thereby reducing a large number of positioning and retrieving operations of data in the shift register.

By introducing the data padding apparatus 100, a process of data length conversion may be effectively performed during a high-speed data transmission. Compared with directly performing data padding on data with different lengths, a large amount of storage addresses may be saved, meanwhile, a hardware implementation of the data padding device on a chip device based on CXL could meet requirements of high throughput, low latency and small area. The efficiency of centralized data processing is also effectively improved by the way of unified processing of the input data.

Figure 2:
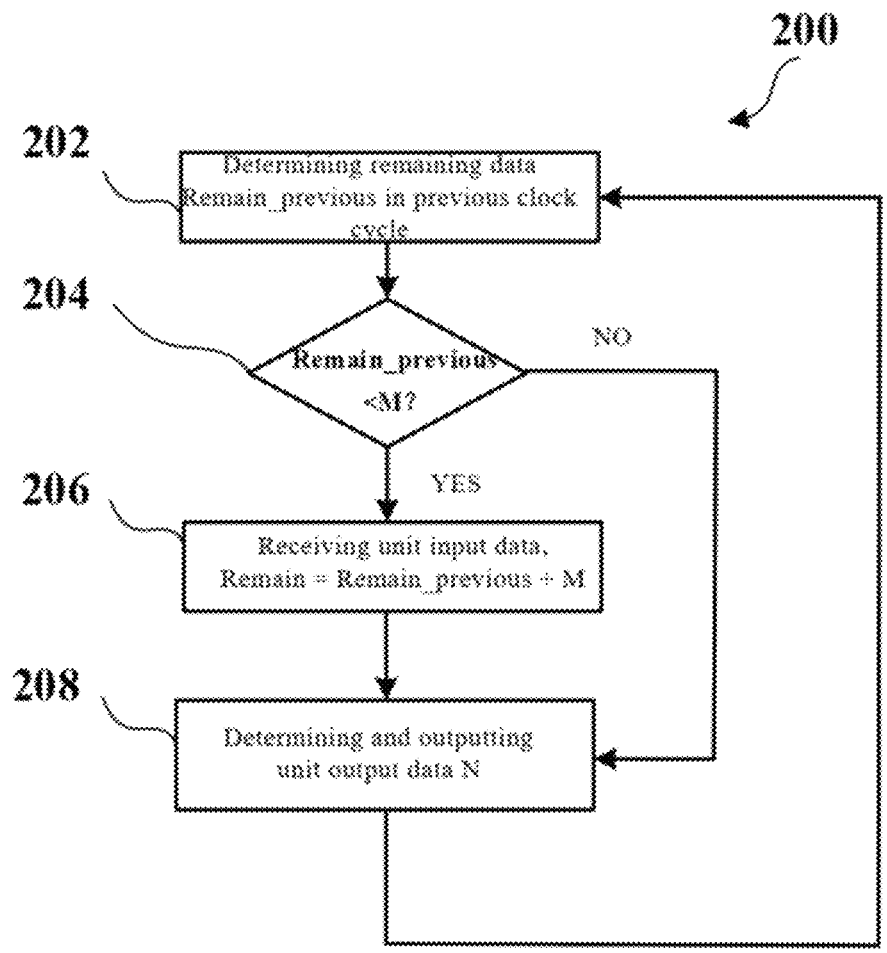
FIG. 2 illustrates a data padding method according to an embodiment of the present application.

FIG. 2 illustrates a data padding method 200 according to an embodiment of the present application. For the convenience of description, the method 200 will be described hereinafter in combination with the data padding apparatus 100 illustrated in FIG. 1, but a person skilled in the art can understand that the method 200 may also be performed by other apparatuses.

As illustrated in FIG. 2, in step 202, a length of a space occupied by the remaining data in the shift register in the previous clock cycle is determined by the shift register, and is denoted as Remain_previous (similarly, which may be in a unit of word).

In step 204, whether the length of the space occupied by the remaining data in the shift register, Remain_previous, is less than the length of the unit input data, which is M words, is determined. Wherein, if Remain_previous is greater than or equal to M, it indicates that there is no need to input a unit input data in the current clock cycle, and step 208 can be directly performed. If Remain_previous is less than M, it indicates that the remaining data in the shift register may not be sufficient for the output of the unit output data in the current clock cycle, and at this time, step 206 is performed.

In step 206, a unit input data is received via an input sliding window of the shift register and the unit input data is stored adjacent to the remaining data, so that the remaining data and the unit input data may be continuously stored in the shift register. At this time, the length of the space occupied by the remaining data in the shift register is equal to a sum of the length of the space occupied by the remaining data in the previous clock cycle and the space length of the unit input data, denoted as Remain=Remain_previous+M. It should be noted that in the following part, inputting a unit input data is taken as an example, but it can be understood that the shift register may include multiple storage spaces of the same length, thereby processing multiple unit data in parallel, for example, processing multiple unit input data per batch. In some embodiments, the data padding apparatus may further include multiple shift registers, thereby processing multiple unit input data in parallel in the multiple shift registers.

Step 208: the length of the unit output data (N words) is determined by the shift register and the unit output data is output via an output sliding window of the shift register. The length of the unit output data output per clock cycle may be different. For example, N words may equal to 16 words, 15 words, or 12 words. Therefore, the value of the length of the unit output data needs to be determined before it is output. In practical applications, the size of N mainly depends on the data flow of the CXL data link layer. When the unit output data is output, starting from an address space of the lowest bit of the shift register, a portion of data with a length of N words is continuously intercepted from the current remaining data as the unit output data for output. After the unit output data with a length of N words is output, the data remaining in the current shift register is left-shifted as a whole to an address space starting from the lowest bit of the shift register by an offset of N words, thereby ensuring that the remaining data is always stored starting from the lowest address space of the shift register.

It can be understood that after the data is output by the output unit, the length of the space occupied by the remaining data in the current shift register is in two situations: in the first situation, when the length of the space occupied by the remaining data in the shift register in the previous clock cycle, Remain_previous, is greater than or equal to M, the space length of the remaining data in the current clock cycle is Remain=Remain_previous−N (words). In the second situation, when the length of the space occupied by the remaining data in the shift register in the previous clock cycle, Remain_previous, is less than M, the space length of the remaining data in the current clock cycle is Remain=Remain_previous+M−N (words). After the data is output by the output unit, the method could return to step 202 to repeat the above steps.

Through the above steps, the method 200 enables the input data to be padded and output in a required output data format, and avoids invalid data padding operations. In the process of realizing the implementation of CXL IDE, the above method, which uniformly processes FLIT data contents with different lengths to make data of different lengths have a data length computable by the AES_GCM algorithm, may meet the requirements of high throughput, low latency, and easy integration, and compared with existing data padding methods, the data padding method may significantly improve the processing efficiency of data reading and writing.

Figure 3:
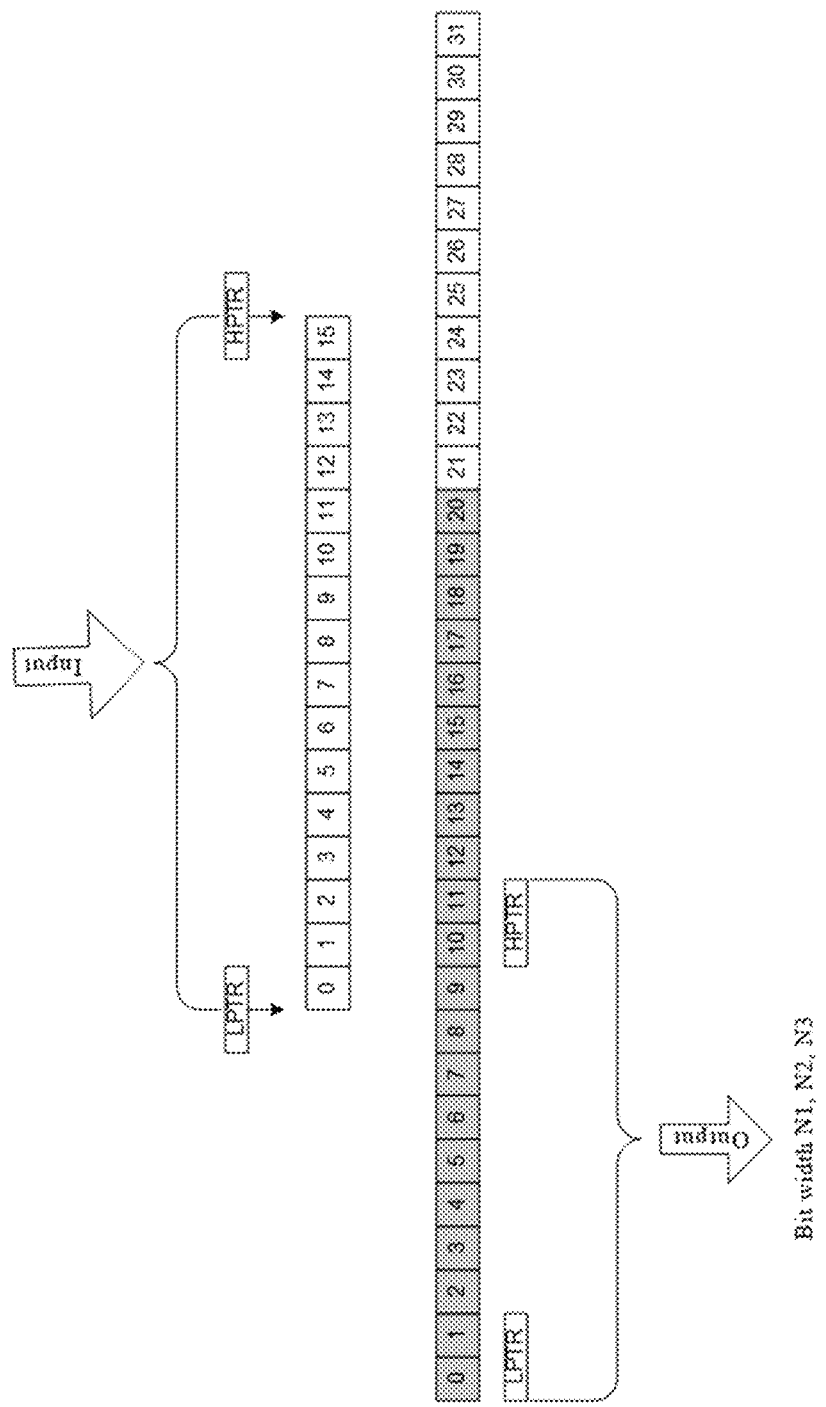
FIG. 3 illustrates examples of an input pointer and an output pointer according to an embodiment of the present application.

FIG. 3 illustrates exemplary diagrams of an input sliding window and an output sliding window of the shift register according to an embodiment of the present application. For the convenience of description, the example in FIG. 3 will be described below in conjunction with the data padding apparatus 100 illustrated in FIG. 1.

Since there may be a large number of unit input data for data padding, in order to efficiently input the unit input data with a length of M words into the shift register and output the unit output data with a length of N words from the shift register, in some embodiments, the input pointer register 104 and the output pointer register 105 may be set in the data padding apparatus 100 in order to accurately indicate positions of the unit input data and the unit output data in the shift register 101.

Take FIG. 3 as an example, the length of the shift register is 32 words (equivalent to 2M), that is, the shift register has address spaces corresponding to 32 words, and each address space may be used to store data respectively. For the sake of simple description, for example, the address spaces of the shift register are represented as 0, 1, 2 . . . , 31 from low to high. As can be seen from FIG. 3, data of 21 words is stored in the current shift register, which are arranged in the address spaces from low to high (represented as 0, 1, 2 . . . 20, respectively). In the current clock cycle, the length of the unit output data to be output (N words) is determined as 12 words, and when the output unit outputs the data, 12 words may be intercepted, starting from a low address space of the shift register, in sequence as the unit output data for output. The address spaces where the intercepted unit output data is positioned are 0, 1, 2 . . . 11, respectively. In order to accurately identify the position of the output data in the shift register, the low-bit output pointer in the output pointers indicates a starting point of the unit output data, and at this time, the low-bit output pointer points to the lowest address space 0 of the shift register. The high-bit output pointer in the output pointers indicates an end point of the output data, and at this time, the high-bit output pointer points to an address space where the 12$^{th}$ word of the shift register is positioned, that is, the address space 11 of the shift register. Thus, it can be seen that the low-bit output pointer and the high-bit output pointer together form an output sliding window for indicating the unit output data to be output.

When the value of the length of the unit output data (N words) changes, the low-bit output pointer does not change and always points to the lowest address space of the shift register, that is, the address space 0 of the shift register. However, the position indicated by the high-bit output pointer changes according to the value of N. For example, when N is equal to 16, the high-bit output pointer points to an address space where the 16$^{th}$ word of the shift register is positioned, that is, the address space 15 of the shift register; and when N is equal to 15, the high-bit output pointer points to an address space where the 15$^{th}$ word of the shift register is positioned, that is, the address space 14 of the shift register.

After the unit output data with a length of N words is output, data of 9 words is remained in the shift register. At this time, the remaining data of 9 words need to be shifted to the low address space of the shift register, that is, the data of 9 words originally stored in address spaces from 12 to 20 need to be shifted to address spaces from 0 to 8. It is determined that the remaining data of 9 words are not sufficient for the next output of the unit output data (such as 12, 15, or 16 words). Therefore, in the next clock cycle, the shift register receives the next unit input data of M words. At this time, in order to accurately ensure that the next unit input data can be continuously stored with the remaining data of 9 words in the shift register, the input pointer is required to identify the position where the next unit input data is to be inserted. For example, the low-bit input pointer in the input pointers indicates a starting point of an input position of the unit input data, and the high-bit input pointer indicates an end point of the input position of the unit data input. As can be seen from FIG. 3, the low-bit input pointer points to an address space next to the address space where data of the last word in the remaining data is positioned, that is, it points to the address space 9 of the shift register. After the position of the low-bit input pointer and the length of the unit input data (M words) are determined, the position of the high-bit input pointer may be determined, that is, it points to the address space 24 of the shift register. Thus, the low-bit input pointer and the high-bit input pointer together form an input sliding window for data input. By using the output sliding window and the input sliding window to input and output data, positions of the input data and the output data may be accurately and efficiently positioned in the shift register, which improves the efficiency of data padding and processing.

Figure 4:
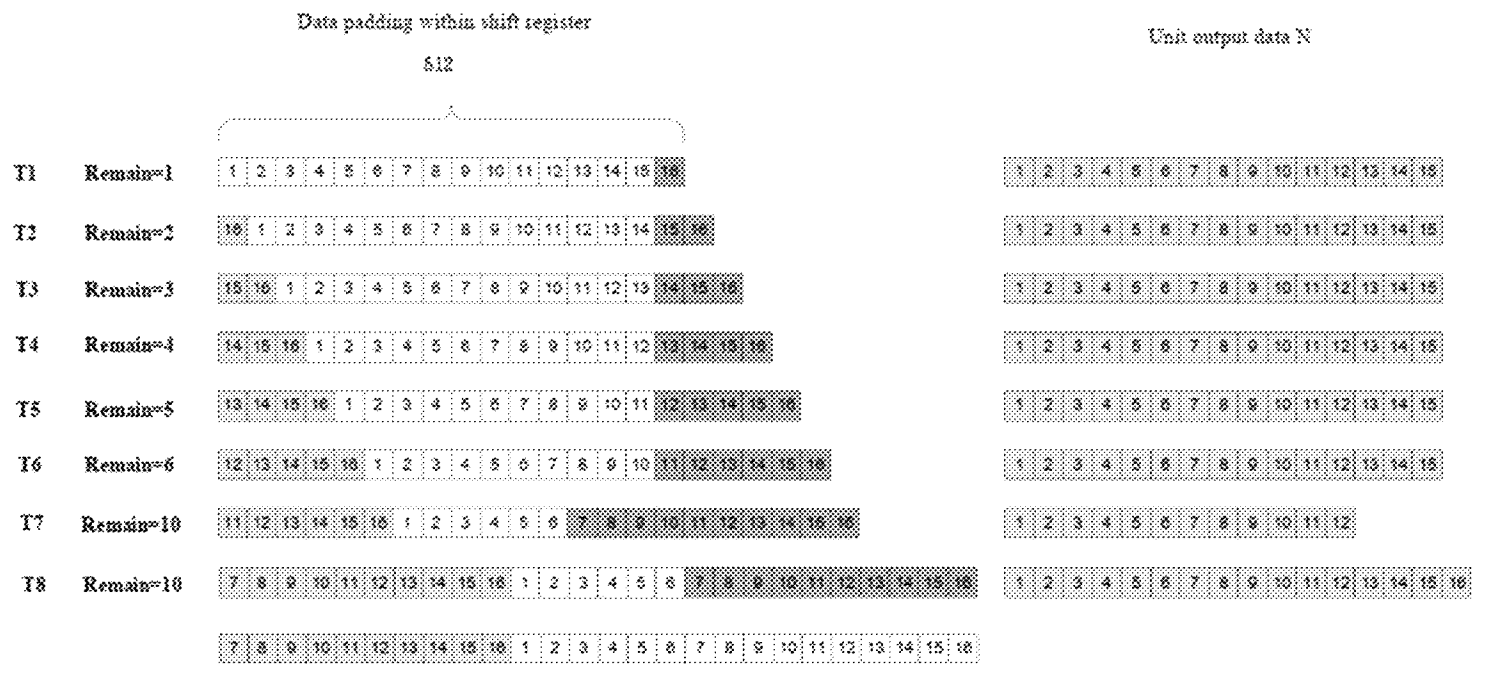

FIG. 4 illustrates an example of performing data padding by the data padding apparatus illustrated in FIG. 1 in different clock cycles according to an embodiment of the present application. Specifically, FIG. 4 illustrates data padding situations in the shift register within T1-T8 clock cycles and the situation of the unit output data in each clock cycle.

At T1 moment, no data is stored in the shift register, and the shift register receives the first unit input data and continuously stores the first unit input data in the shift register. The length of the unit input data, M, is equal to 16, that is, 16 words, and the unit input data occupies data spaces from the first to $16^{th}$ words in the shift register (corresponding to the address spaces 0-15 of the shift register). Subsequently, it is determined that the length of the unit output data at the T1 moment is N1 words, where N1=15, thereby triggering the reading of data of the first 15 words in the shift register, which corresponds to the address spaces 0-14 of the shift register. After reading the data of the first 15 words, only 1-word data remains in the shift register at the T1 moment, Remain=M−N1=1 (1 word), and the remaining data is positioned in the address space 15 of the shift register. The shift register shifts the remaining data from the address space 15 of the shift register to the address space 0 of the shift register for subsequent data padding.

At T2 moment, only 1-word data remains in the shift register at the T1 moment, denoted as Remain_previous=1 (word). It is determined that the remaining data, Remain_previous, at the T1 moment is less than 16 words, thus the second unit input data needs to be received and continuously stored subsequent to the remaining data in the shift register. Herein, the second unit input data occupies data spaces from the $2^{nd}$ to $17^{th}$ words in the shift register (corresponding to address spaces 1-16 of the shift register). At this time, the length of the space occupied by the data in the shift register is Remain=Remain_previous+16=1+16=17 (words). Subsequently, it is determined that the length of the unit output data at the T2 moment is N2 words, where N2=15, triggering the reading of the data of the first 15 words by the shift register, and the data corresponds to the address spaces 0-14 of the shift register. After the data of the first 15 words is read, at this time, only 2-words data remains in the shift register at the T2 moment, which is positioned in the address spaces 15-16 of the shift register. The shift register left-shifts the remaining data positioned in the address spaces 15-16 of the shift register as a whole to the address spaces 0-1 of the shift register for subsequent data padding.

At T3 moment, only 2-words data remains in the shift register at the T2 moment, denoted as Remain_previous=2 (words). It is determined that the remaining data, Remain_previous, at T2 moment is also less than 16 words, thus the third unit input data needs to be received and continuously stored subsequent to the remaining data in the shift register. Herein, the third unit input data occupies the data spaces from the $3^{rd}$ to $18^{th}$ words of the shift register (corresponding to the address spaces 2-17 of the shift register). At this time, the length of the space occupied by the data in the shift register is Remain=Remain_previous+16=2+16=18 (words). Subsequently, it is determined that the length of the unit output data at T3 moment is N3 words, where N3=15, triggering the reading of the data of the first 15 words by the shift register, which corresponds to the address spaces 0-14 of the shift register. After the data of the first 15 words is read, at this time, only 3-words data remains in the shift register at the T3 moment, which is positioned in the address spaces 15-17 of the shift register. The shift register left-shifts the remaining data positioned in the address spaces 15-17 of the shift register as a whole to the address spaces 0-2 of the shift register.

Operations from T4 to T8 moments are similar to those in the previous three moments until all the unit input data are transmitted, which will not be elaborated here.

This application can be applied to conversion processing of data lengths during high-speed data transmission. For example, in an implementation process of CXL IDE, this application may uniformly process FLIT data of different lengths and convert the data of different lengths to a data length of an integral block (that is, 128 bits and its integer multiples) computable by the AES-GCM algorithm. In addition, a hardware(s) used in this application simultaneously satisfies characteristics of high throughput, low latency and small area, has strong adaptability, and can be widely promoted.

It should be noted that although several modules or sub-modules, steps or sub-steps used for the data padding method based on CXL transmission are mentioned in the above detailed description, such division is exemplary and not mandatory. Practically, according to the embodiments of the present application, the features and functions of two or more modules described above can be embodied in one module. In contrast, the features and functions of a module described above can be further divided into multiple modules to be embodied.

Those of ordinary skill in the art can understand and implement other changes to the disclosed embodiments by studying the description, the content of the disclosure, the drawings and the appended claims. In the claims, the word "comprise" does not exclude other elements and steps, and the word "a" and "an" do not exclude plurals. In the actual application of this application, one part may perform the functions of multiple technical features cited in the claims. Any reference signs in the claims should not be construed as limiting the scope.

The invention claimed is:

1. A data padding method comprising:
   determining, after at least part of data in a shift register is output, a length of a space occupied by remaining data in the shift register;
   comparing the length of the space occupied by the remaining data with a length of a unit input data which is M words wherein M is an integer greater than zero;
   performing, in the case where a comparing result indicates that the length of the space occupied by the remaining data is less than the length of the unit input data, following operations:
   receiving a unit input data and storing the unit input data in the shift register, wherein the unit input data is stored continuously with the remaining data;
   determining a length of a unit output data to be output which is N words, wherein N is smaller than or equal to M;
   intercepting a portion of data with a length of N words from data formed by padding the remaining data buffered in the shift register and the unit input data and starting from an address space of a lowest bit of the shift register, as the unit output data and outputting the unit output data wherein N is an integer greater than zero; and shifting the data remaining in the shift register as a whole to an address space in the shift register starting from the lowest bit of the shift register.

2. The data padding method according to claim 1, wherein the data padding method further comprises:

performing, in the case where the comparing result indicates that the length of the space occupied by the remaining data is greater than or equal to the length of the unit input data, following operations:

determining a length of a unit output data to be output which is N words, wherein N is smaller than or equal to M;

intercepting a portion of data with a length of N words from the remaining data buffered in the shift register and starting from an address space of a lowest bit of the shift register, as the unit output data and outputting the unit output data; and shifting the data remaining in the shift register as a whole to an address space in the shift register starting from the lowest bit of the shift register.

3. The data padding method according to claim 1, wherein the unit input data is obtained from a flow control unit in a Compute Express Link.

4. The data padding method according to claim 1, wherein the determining the length of the unit output data to be output comprises:

selecting, from among a plurality of candidate length values of the unit output data, a candidate length value as the length of the unit output data to be output.

5. The data padding method according to claim 1, wherein the determining the length of the unit output data to be output comprises:

determining the length of the unit output data to be output according to a data flow of a data link layer in a Compute Express Link transmission.

6. The data padding method according to claim 1, wherein the receiving a unit input data and storing the unit input data in the shift register comprises:

inputting the unit input data by using an input sliding window, wherein the input sliding window includes a low-bit input pointer indicating a starting point of the unit input data and a high-bit input pointer indicating an end point of the unit input data, wherein, the low-bit input pointer is configured to point to an address space next to an address space where the last data in the remaining data is positioned; and the high-bit input pointer is configured to point to an address space in the shift register where the last bit data in the unit input data is positioned, wherein an interval between the low-bit input pointer and the high-bit input pointer corresponds to an offset of M-1 words.

7. The data padding method according to claim 1, wherein the intercepting the portion of data with the length of N words, starting from the address space of the lowest bit, from data formed by padding the remaining data buffered in the shift register and the unit input data, as the unit output data and outputting the unit output data comprising:

outputting the unit output data by using an output sliding window, wherein the output sliding window includes a low-bit output pointer indicating a starting point of the unit output data and a high-bit output pointer indicating an end point of the unit output data, wherein, the low-bit output pointer is configured to point to the address space of the lowest bit in the shift register; and the high-bit output pointer is configured to point to an address space in the shift register where an $N^{th}$ word is positioned.

8. A data padding apparatus comprising:

a shift register configured to receive and store, under a control of a controller, a unit input data and a unit output data, wherein a length of the unit output data, which is N words, is less than or equal to a length of the unit input data, which is M words wherein M and N are integers greater than zero; and a controller configured to determine, after at least part of data in a shift register is output, a length of a space occupied by remaining data in the shift register, and perform, in the case where the length of the space occupied by the remaining data is less than the length of the unit input data, following operations:

receiving a unit input data and storing the unit input data in the shift register, wherein the unit input data is stored continuously with the remaining data;

determining a length of a unit output data to be output;

intercepting a portion of data with a length of N words from data formed by padding the remaining data buffered in the shift register and the unit input data and starting from an address space of a lowest bit of the shift register, as the unit output data; and shifting the data remaining in the shift register as a whole to an address space in the shift register starting from the lowest bit of the shift register.

9. The data padding apparatus according to claim 8, wherein the controller is further configured to perform, in the case where the length of the space occupied by the remaining data is greater than or equal to the length of the unit input data, following operations:

determining a length of a unit output data to be output;

intercepting a portion of data with a length of N words from the remaining data buffered in the shift register and starting from an address space of a lowest bit of the shift register, as the unit output data and outputting the unit output data; and shifting the data remaining in the shift register as a whole to an address space in the shift register starting from the lowest bit of the shift register.

10. The data padding apparatus according to claim 8, wherein the data padding apparatus further comprises:

an input pointer register including a low-bit input pointer indicating a starting point of the unit input data and a high-bit input pointer indicating an end point of the unit input data, wherein the low-bit input pointer is configured to point to an address space next to an address space where the last data in the remaining data is positioned, and the high-bit input pointer is configured to point to an address space in the shift register where the last bit data in the unit input data is positioned, wherein an interval between the low-bit input pointer and the high-bit input pointer corresponds to an offset of M-1 words.

11. The data padding apparatus according to claim 8, wherein the data padding apparatus further comprises:

an output pointer register including a low-bit output pointer indicating a starting point of the unit output data and a high-bit output pointer indicating an end point of the unit output data, wherein the low-bit output pointer is configured to point to the address space of the lowest bit in the shift register, and the high-bit output pointer is configured to point to an address space in the shift register where an $N^{th}$ word is positioned.

* * * * *